(12) United States Patent
Ito et al.

(10) Patent No.: US 9,800,710 B2
(45) Date of Patent: Oct. 24, 2017

(54) MONITORING SYSTEM, MONITORING DEVICE, MONITORING METHOD, AND PROGRAM

(71) Applicant: Mitsubishi Electric Corporation, Tokyo (JP)

(72) Inventors: Takahiro Ito, Tokyo (JP); Satoshi Minezawa, Tokyo (JP); Hirotoshi Yano, Tokyo (JP); Masaaki Yabe, Tokyo (JP); Ichiro Maruyama, Tokyo (JP); Shinji Nakamura, Tokyo (JP); Hiroko Izumihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/027,531

(22) PCT Filed: Nov. 13, 2013

(86) PCT No.: PCT/JP2013/080665
§ 371 (c)(1),
(2) Date: Apr. 6, 2016

(87) PCT Pub. No.: WO2015/071972
PCT Pub. Date: May 21, 2015

(65) Prior Publication Data
US 2016/0248898 A1    Aug. 25, 2016

(51) Int. Cl.
*H04M 1/72* (2006.01)
*H04M 1/725* (2006.01)
(Continued)

(52) U.S. Cl.
CPC .... *H04M 1/72533* (2013.01); *H04L 12/2827* (2013.01); *H04Q 9/00* (2013.01); *H04Q 2209/823* (2013.01)

(58) Field of Classification Search
CPC ..................................................... H04M 1/725
See application file for complete search history.

(56) References Cited

U.S. PATENT DOCUMENTS

2006/0168236 A1   7/2006 Higuma et al.
2009/0179490 A1   7/2009 Nagao
(Continued)

FOREIGN PATENT DOCUMENTS

JP    H10-063378 A    3/1998
JP    2002-073966 A   3/2002
(Continued)

OTHER PUBLICATIONS

International Search Report of the International Searching Authority dated Feb. 10, 2014 for the corresponding International application No. PCT/JP2013/080665 (and English translation).

(Continued)

*Primary Examiner* — Michael T Vu
(74) *Attorney, Agent, or Firm* — Posz Law Group, PLC

(57) ABSTRACT

A monitoring system includes electric devices, communication adaptors communicably connecting the electric devices with a network, and a monitoring device monitoring the status of each electric device. The monitoring device acquires from user input a type of running indicating whether or not the status of the electric device is always ON. The monitoring device transmits to each electric device a status acquisition request requesting acquisition of the status of the electric device. Then the monitoring device determines the status of the electric device based on a response to the transmitted status acquisition request and the acquired type of running.

7 Claims, 19 Drawing Sheets

(51) Int. Cl.
*H04Q 9/00* (2006.01)
*H04L 12/28* (2006.01)

(56) References Cited

U.S. PATENT DOCUMENTS

| 2010/0250724 | A1* | 9/2010 | Kawai | F24F 11/006 |
| | | | | 709/223 |
| 2012/0095606 | A1* | 4/2012 | Besore | A47L 15/0047 |
| | | | | 700/291 |

FOREIGN PATENT DOCUMENTS

| JP | 2003-289589 A | 10/2003 |
| JP | 2004-221770 A | 8/2004 |
| JP | 2005-184481 A | 7/2005 |
| JP | 2009-169551 A | 7/2009 |
| JP | 2011-135467 A | 7/2011 |
| JP | 2011-250027 A | 12/2011 |
| JP | 2013-197696 A | 9/2013 |
| WO | 2004/032425 A1 | 4/2004 |

OTHER PUBLICATIONS

Office Action dated Feb. 14, 2017 issued in corresponding JP patent application No. 2015-547319 (and English translation).

* cited by examiner

FIG.5

RUNNING TYPE TABLE  321

| DEVICE ID | RUNNING TYPE |
|---|---|
| DEV_1 | ALWAYS-ON RUNNING |
| DEV_2 | RUN BY USER OPERATION |
| DEV_3 | RUN BY USER OPERATION |
| ⋮ | ⋮ |

MONITORING SYSTEM, MONITORING DEVICE, MONITORING METHOD, AND PROGRAM

CROSS REFERENCE TO RELATED APPLICATION

This application is a U.S. national stage application of International Patent Application No. PCT/JP2013/080665 filed on Nov. 13, 2013, the content of which is incorporated herein by reference.

TECHNICAL FIELD

The present disclosure relates to a monitoring system, a monitoring device, a monitoring method, and a program which monitor a running status of an electric device.

BACKGROUND

Conventionally, a device-data collecting system has been proposed which monitors a running condition of an electric device, and which utilizes such data to detect a malfunction and to accomplish energy saving (see, for example, Patent Literature 1).

PATENT LITERATURE

Patent Literature 1: Unexamined Japanese Patent Application Kokai Publication No. 2003-289589

According to the system disclosed in Patent Literature 1, when the electric device does not respond to a request to acquire the status of the electric device, the system is not capable of determining whether such an event is due to an abnormality existing in a communication, or is due to the electric device not being turned ON and thus failing to perform communication.

SUMMARY

The present disclosure has been made in view of the foregoing circumstances, and an objective of the present disclosure is to provide a monitoring system, a monitoring device, a monitoring method, and a program which are capable of highly precisely monitoring a running status of an electric device.

In order to accomplish the above objective, a monitoring system according to the present disclosure includes an electric device, and a monitoring device configured to be communicably connected with the electric device and to monitor a status of the electric device. An acquirer of the monitoring device is configured to acquire a type of running indicating whether or not the status of the electric device is always ON. A status acquisition request transmitter of the monitoring device is configured to transmit to the electric device a status acquisition request that requests acquisition of the status of the electric device. A determiner of the monitoring device is configured to determine the status of the electric device based on a response to the status acquisition request transmitted by the status acquisition request transmitter and the type of running acquired by the acquirer.

According to the present disclosure, the status of an electric device is determined based on a response from the electric device to a status acquisition request, and the type of running of the electric device. Hence, the running status of the electric device can be monitored more precisely.

BRIEF DESCRIPTION OF DRAWINGS

FIG. 5 is a diagram illustrating an example of data contained in a running type table;

DETAILED DESCRIPTION

Embodiments of the present disclosure are described in detail with reference to the accompanying figures.

First Embodiment

Figure 1:
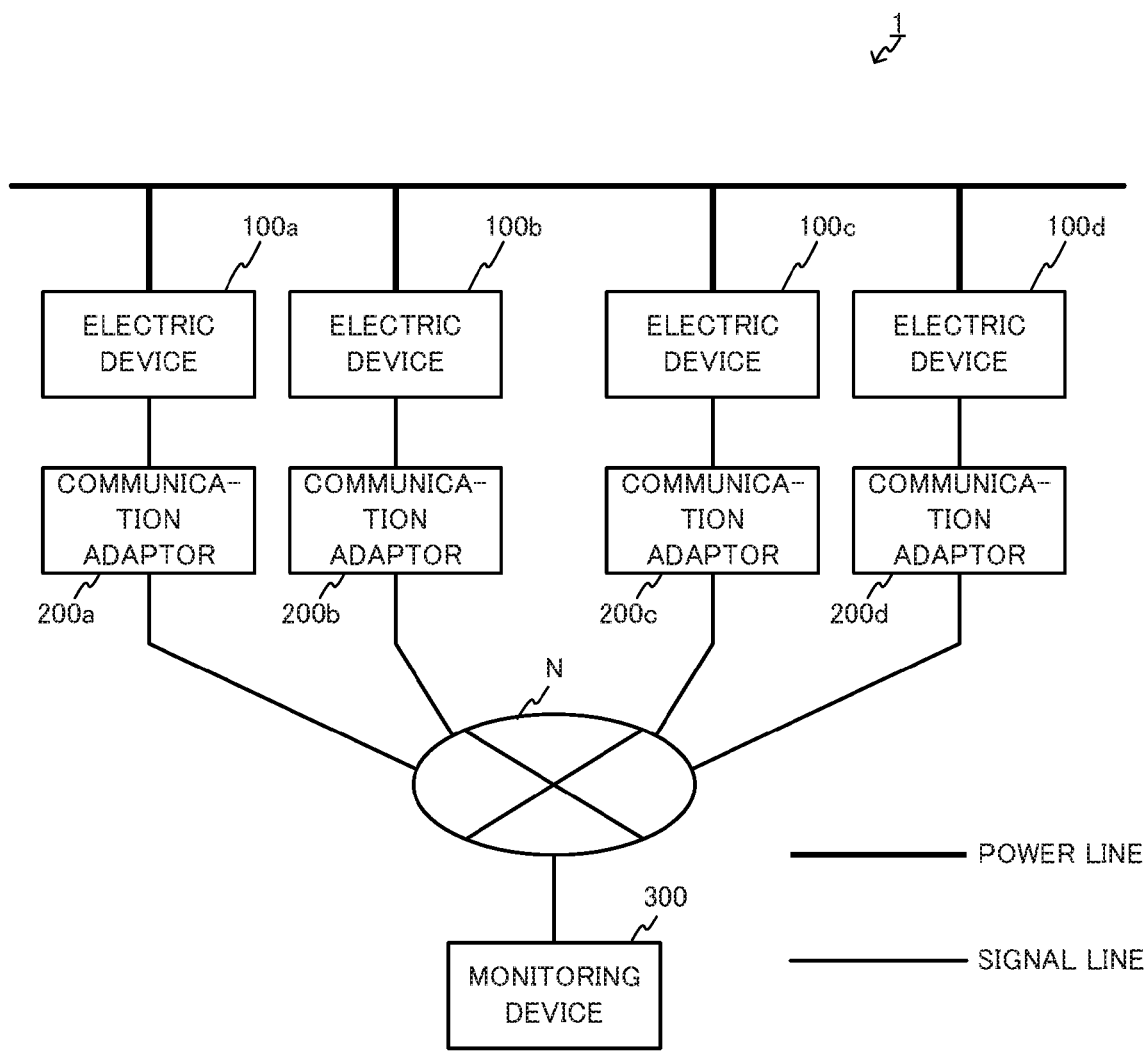
FIG. 1 is a schematic block diagram illustrating an example of a configuration of a monitoring system according to a first embodiment.

FIG. 1 is a schematic block diagram illustrating an example of a configuration of a monitoring system 1 according to a first embodiment of the present disclosure. The monitoring system 1 monitors running conditions of electric devices 100a to 100d. As illustrated in FIG. 1, the monitoring system 1 includes the electric devices 100a to 100d, communication adaptors 200a to 200d that connect the corresponding electric devices 100a to 100d with a network N, and a monitoring device 300 that monitors the respective running conditions of the electric devices 100a to 100d. Note that in FIG. 1, the four electric devices 100a to 100d, and the four communication adaptors 200a to 200d are illustrated as an example case, but the number of electric devices 100a to 100d, and that of the communication adaptors 200a to 200d are not limited to this example case.

Each of the electric devices 100a to 100d is a device that runs on power supplied from an unillustrated commercial power supply via a power line. The electric devices 100a to 100d are communicably connected to the corresponding communication adaptors 200a to 200d in a wired manner. Note that in the following description, the electric devices 100a to 100d are collectively referred to as an electric device 100.

In this embodiment, the electric device 100 is classified into either one of two types of running, one of which is an "always-ON running" type in which the status of the electric device 100 is always ON, and the other type is a "run by user operation" type in which the status of the electric device 100 is not always ON. The electric device 100 that is always ON means a device continuously running once turned ON to perform the intended functions of the device, and the ON-OFF status of such a device is not frequently switched by a user's operation. More specifically, examples of the electric device 100 classified into "always-ON running" include a refrigerator and a security device. The electric device 100 classified into "run by user operation" is an electric device 100 other than the electric device 100 classified into "always-ON running" and is, for example, an air conditioner or a television device.

The communication adaptors 200a to 200d are communicably connected with the network N in a wireless or wired manner. Note that in the following description, the communication adaptors 200a to 200d are collectively referred to as a communication adaptor 200.

In this embodiment, the communication adaptor 200 is supplied with running power from the corresponding electric device 100. Hence, in accordance with the switching of the ON-OFF status of the electric device 100, the ON-OFF status of the communication adaptor 200 is also switched.

The monitoring device 300 is communicably connected with the network N in a wired or wireless manner. The monitoring device 300 receives, from the electric device 100 via the communication adaptor 200 and the network N, data indicating the running status of that electric device 100, and determines whether or not an abnormality exists in the electric device 100.

Next, a configuration of the monitoring device 300 in this embodiment is described.

Figure 2:
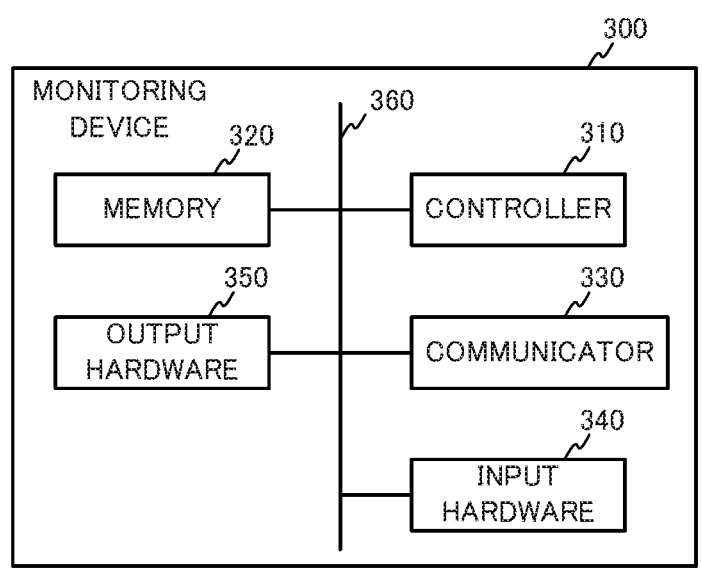
FIG. 2 is a schematic block diagram illustrating an example of a hardware configuration of a monitoring device according to the first embodiment.

FIG. 2 illustrates an example of a hardware configuration of the monitoring device 300 according to this embodiment. As illustrated in FIG. 2, the monitoring device 300 includes a controller 310, a memory 320, a communicator 330, input hardware 340, and output hardware 350, and those components are connected to one another via a bus 360.

The controller 310 includes, for example, a central processing unit (CPU), a read only memory (ROM) that stores a program to be executed by the CPU, a random access memory (RAM) that temporarily stores data generated by the CPU, and a timer that counts the current time. The controller 310 controls the entire monitoring device 300.

The memory 320 includes a writable memory device, such as a hard disk drive, a flash memory, or a solid state drive (SSD).

The communicator 330 includes an interface that exchanges data with the network N.

The input hardware 340 includes input devices, such as a button, a touch panel, a keyboard, and/or the like. The input hardware 340 accepts an operation input by the user, and outputs, to the controller 310, an operation input signal corresponding to the accepted operation input.

The output hardware 350 includes a display device, such as a cathode ray tube (CRT), a liquid crystal display, and/or the like, and displays data on letters, images, and/or the like that are supplied from the controller 310.

Figure 3:
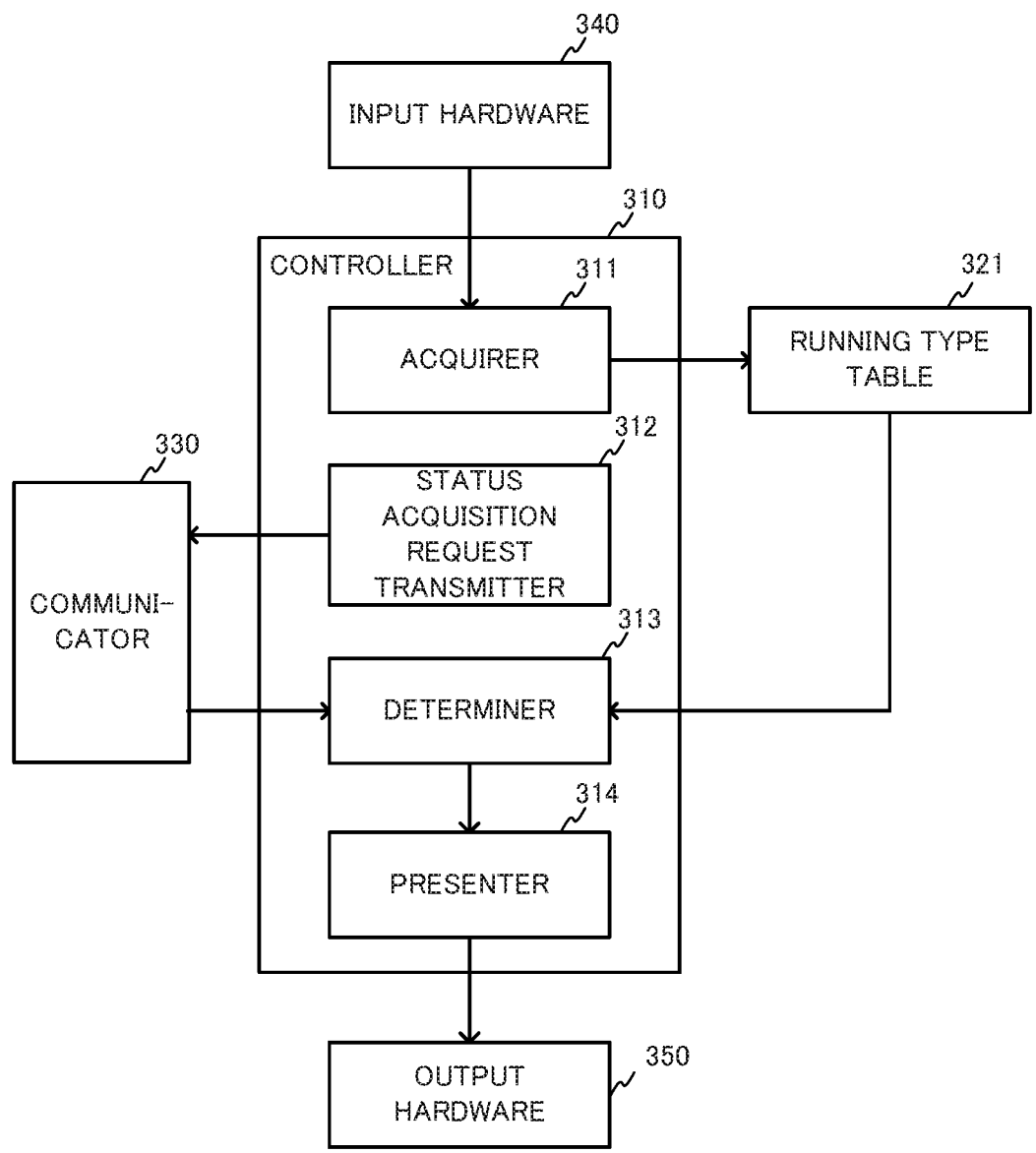
FIG. 3 is a schematic block diagram illustrating an example of a functional configuration of the monitoring device according to the first embodiment.

Next, functions of the controller 310 in the monitoring device 300 are described. FIG. 3 is a block diagram illustrating an example of a functional configuration of the controller 310. As illustrated in FIG. 3, the controller 310 functions as an acquirer 311, a status acquisition request transmitter 312, a determiner 313, and a presenter 314.

The acquirer 311 acquires the type of running of the electric device 100. More specifically, the acquirer 311 accepts a user input indicating the running type of the electric device 100 via the input hardware 340.

Figure 4:
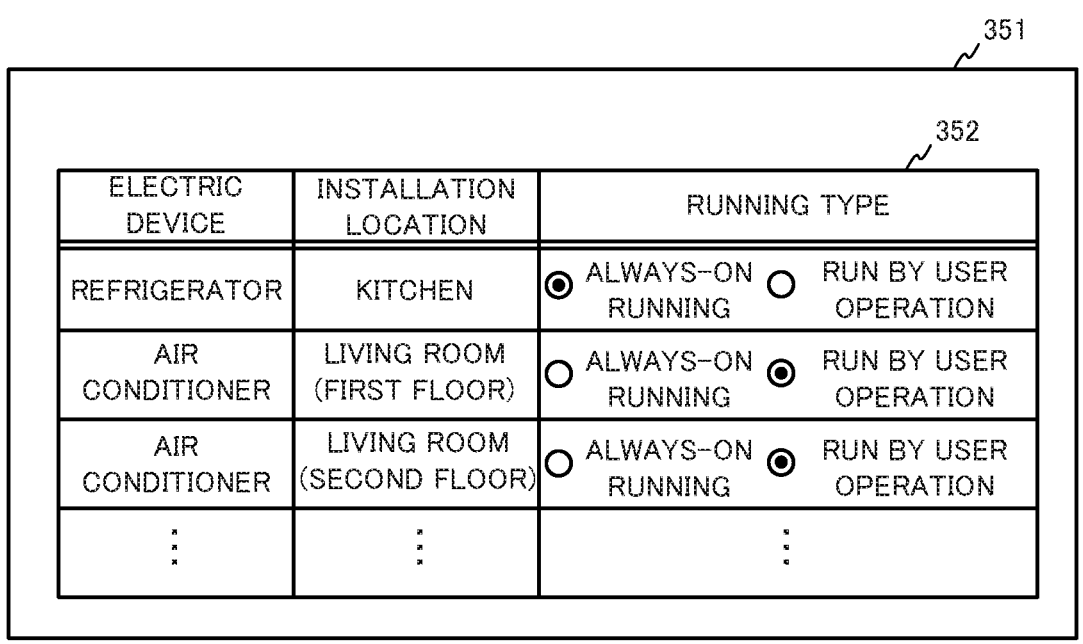
FIG. 4 is a diagram illustrating an example of a setting table displayed on a screen of output hardware in the monitoring device.

FIG. 4 illustrates an example of a screen 351 of the output hardware 350 at the time of setting the running type of the electric device 100 by the user. The screen 351 illustrated in FIG. 4 displays therein a setting table 352 that enables the user to select the running type for each electric device 100. More specifically, the electric device 100, an installation location, and the running type are associated with one another in the setting table 352. When, for example, the user wants to set the running type of an air conditioner installed in the living room on the first floor to "run by user operation", the user selects the "run by user operation" as the running type corresponding to the electric device "air conditioner" and the installation location "living room (first floor)" in the setting table 352 via the input hardware 340, thereby accomplishing the setting.

The acquirer 311 stores, in a running type table 321 in the memory 320, the running type of the electric device 100 accepted from the user via the input hardware 340. FIG. 5 illustrates an example of data contained in the running type table 321. A device ID to identify the electric device 100, and the running type of the electric device 100 identified by the device ID are contained in the running type table 321 in FIG. 5.

The status acquisition request transmitter 312 transmits, to the electric device 100, a status acquisition request to acquire the status of the electric device 100. More specifically, the status acquisition request transmitter 312 transmits the status acquisition request to the electric device 100 periodically or in accordance with a request from the user.

The determiner 313 determines the status of the electric device 100 based on a response to the status acquisition request that has been transmitted by the status acquisition request transmitter 312, and the running type acquired by the acquirer 311.

More specifically, when the determiner 313 does not receive from the electric device 100 a response to the status acquisition request transmitted by the status acquisition request transmitter 312, and when the running type of the electric device 100 stored in the running type table 321 is not indicated as "always-ON running", the determiner 313 determines that there is a possibility that the status of the electric device 100 is OFF.

In addition, when the determiner 313 does not receive from the electric device 100 a response to the status acquisition request that has been transmitted by the status acquisition request transmitter 312, and when the running type of the electric device 100 stored in the running type table 321 is indicated as "always-ON running", the determiner 313 determines that an abnormality exists in the communication between the electric device 100 and the monitoring device 300.

That is, when the determiner 313 does not receive from the electric device 100 a response to the status acquisition request transmitted by the status acquisition request transmitter 312, there are two possible causes of such an event: (i) the status of the electric device 100 is OFF; and/or (ii) an abnormality exists in the communication between the electric device 100 and the monitoring device 300. When the running status of the electric device 100 is "always-ON running", the possibility of the above (i) is low, and thus the determiner 313 determines that an abnormality exists in the communication between the electric device 100 and the monitoring device 300. In addition, when the running status of the electric device 100 is not "always-ON running", that is, when the running status is "run by user operation", the above (i) and/or (ii) could be possible, and thus the determiner 313 determines that the status of the electric device 100 may be OFF In addition, when receiving from the electric device 100 a response to the status acquisition request that has been transmitted by the status acquisition request transmitter 312, the determiner 313 determines whether or not such a response contains malfunction information indicating that the electric device 100 is malfunctioning. If the response contains the malfunction information, the determiner 313 determines that the electric device 100 is malfunctioning. Conversely, if the response does not contain the malfunction information, the determiner 313 determines that the electric device 100 is running normally.

The presenter 314 presents, to the output hardware 350, the status of the electric device 100 determined by the determiner 313.

Figure 6:
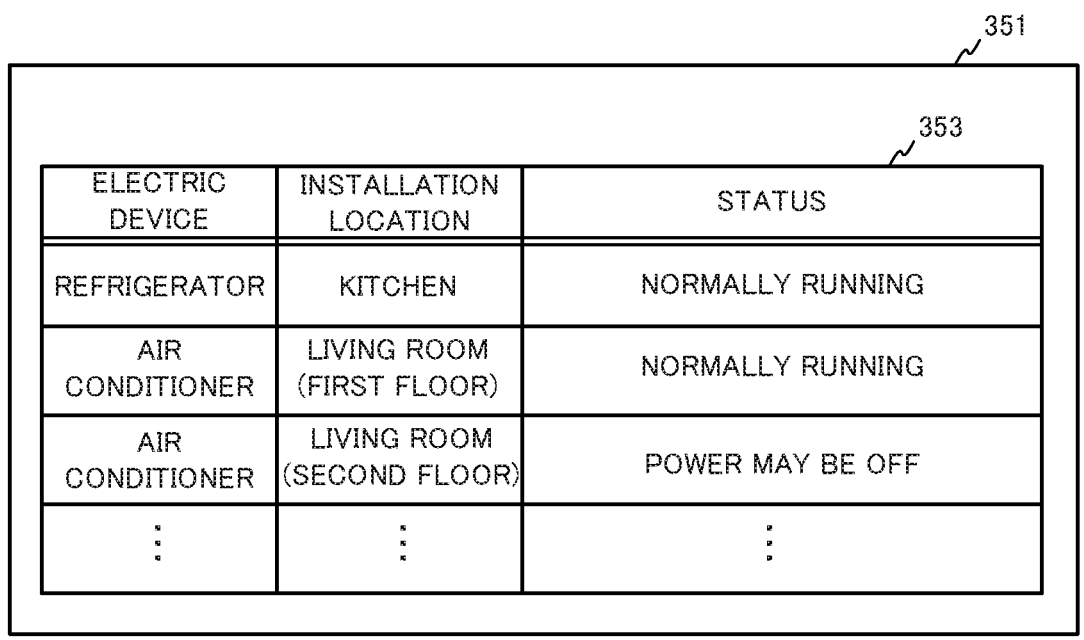
FIG. 6 is a diagram illustrating an example of a determination result table displayed on the screen of the output hardware in the monitoring device.

FIG. 6 illustrates an example of a screen 351 of the output hardware 350 that displays the status of the electric device 100. On the screen 351 illustrated in FIG. 6, a determination result table 353 is displayed that indicates, for each electric device 100, the status of the electric device 100 determined by the determiner 313. More specifically, the determination result table 353 contains, in association with one another, the electric device 100, the installation location, and the status of the electric device 100 determined by the determiner 313. When, for example, the determiner 313 determines that the status of an air conditioner installed in a living room on a second floor may be OFF, the presenter 314 presents, in the determination result table 353, a message that "the power may be OFF" for the status corresponding to the electric device that is "air conditioner" and the installation location that is "living room (second floor)".

Figure 7:
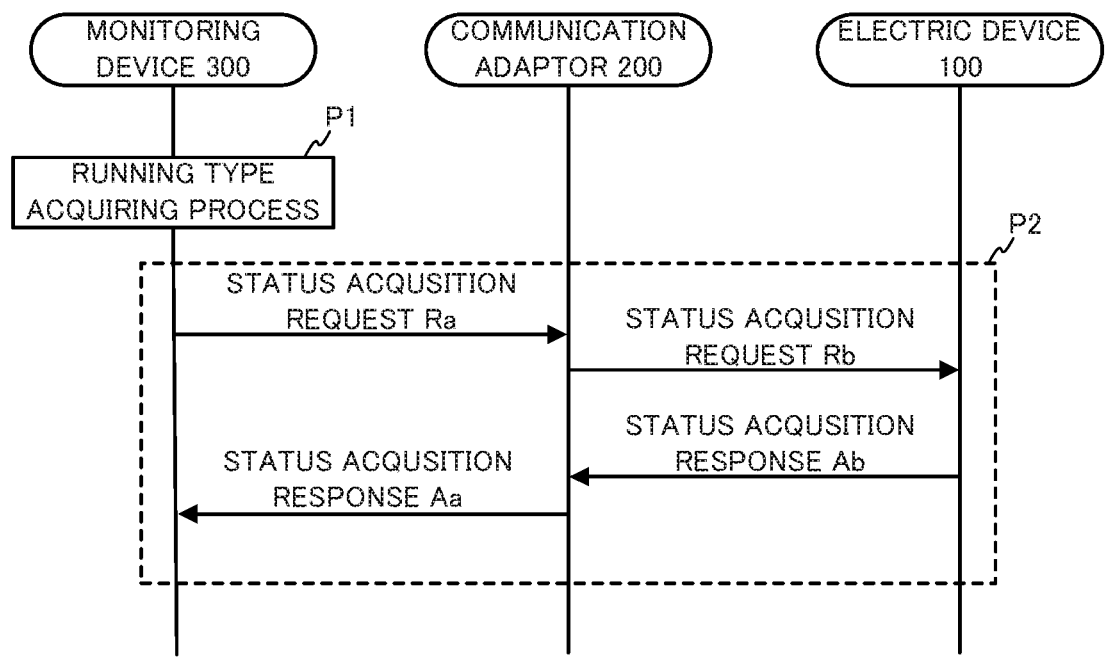
FIG. 7 shows an example of a sequence diagram of the monitoring system according to the first embodiment.

Next, an operation of the monitoring system 1 according to this embodiment is described. FIG. 7 is an example of a sequence diagram of the monitoring system 1 according to this embodiment.

First of all, upon user input, the monitoring device 300 executes a running type acquiring process (P1) to acquire a running type of the electric device 100. Then, the monitoring device 300 transmits a status acquisition request Ra to the communication adaptor 200. The communication adaptor 200 that has received the status acquisition request Ra from the monitoring device 300 transmits a status acquisition request Rb to the electric device 100.

The electric device 100 that has received the status acquisition request Rb from the communication adaptor 200 transmits to the communication adaptor 200 a status acquisition response Ab that contains information on the status of the electric device. The communication adaptor 200 that has received the status acquisition response Ab from the electric device 100 transmits a status acquisition response Aa to the monitoring device 300.

The process, starting upon the transmission of the status acquisition request Ra by the monitoring device 300 and ending upon receipt of the status acquisition response Aa, that is, the process P2 surrounded by dashed lines in FIG. 7, is repeated periodically.

Next, an operation of the monitoring device 300 according to this embodiment is described.

Figure 8:
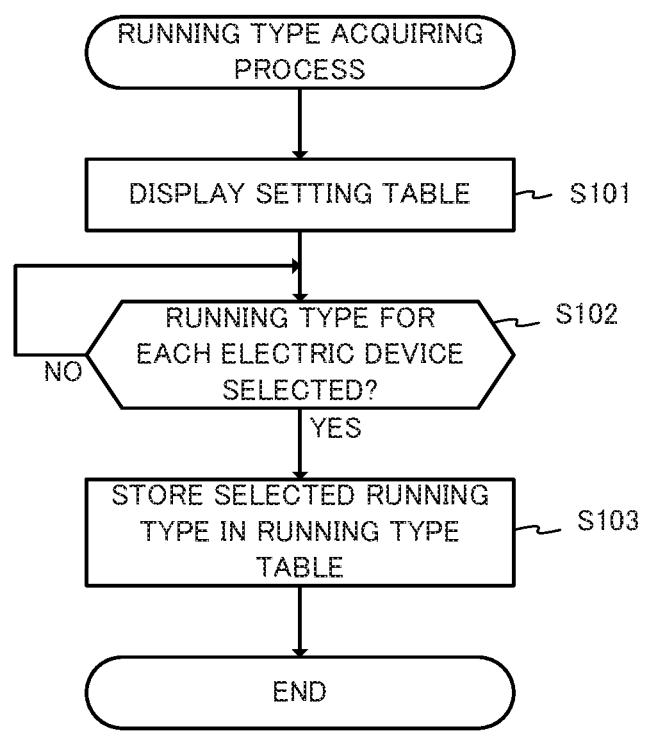
FIG. 8 shows an example of a flowchart of a running type acquiring process according to the first embodiment.

First, the running type acquiring process executed by the monitoring device 300 is described. FIG. 8 is an example of a flowchart of the running type acquiring process executed by the controller 310 of the monitoring device 300. The running type acquiring process is executed by, for example, the CPU of the controller 310 reading the program that is stored in the ROM. In addition, the running type acquiring process starts upon, for example, acceptance of an operation input that is received from the user via the input hardware 340 and instructs the start of the running type acquiring process.

First, the acquirer 311 displays the setting table 352 as illustrated in FIG. 4 on the screen 351 of the output hardware 350 (step S101).

Next, the acquirer 311 determines, for each electric device 100, whether either one of the running types, "always-ON running" or "run by user operation", has been selected by the user (step S102). The acquirer 311 stands by (step S102: NO) until the running type for each electric device 100 is selected by the user.

When determining that the user has selected the running type for each electric device 100 (step S102: YES), the acquirer 311 stores in the running type table 321 the running type selected for each electric device 100, in association with the corresponding device ID of the electric device 100 (step S103). Subsequently, this process is ended.

Figure 9:
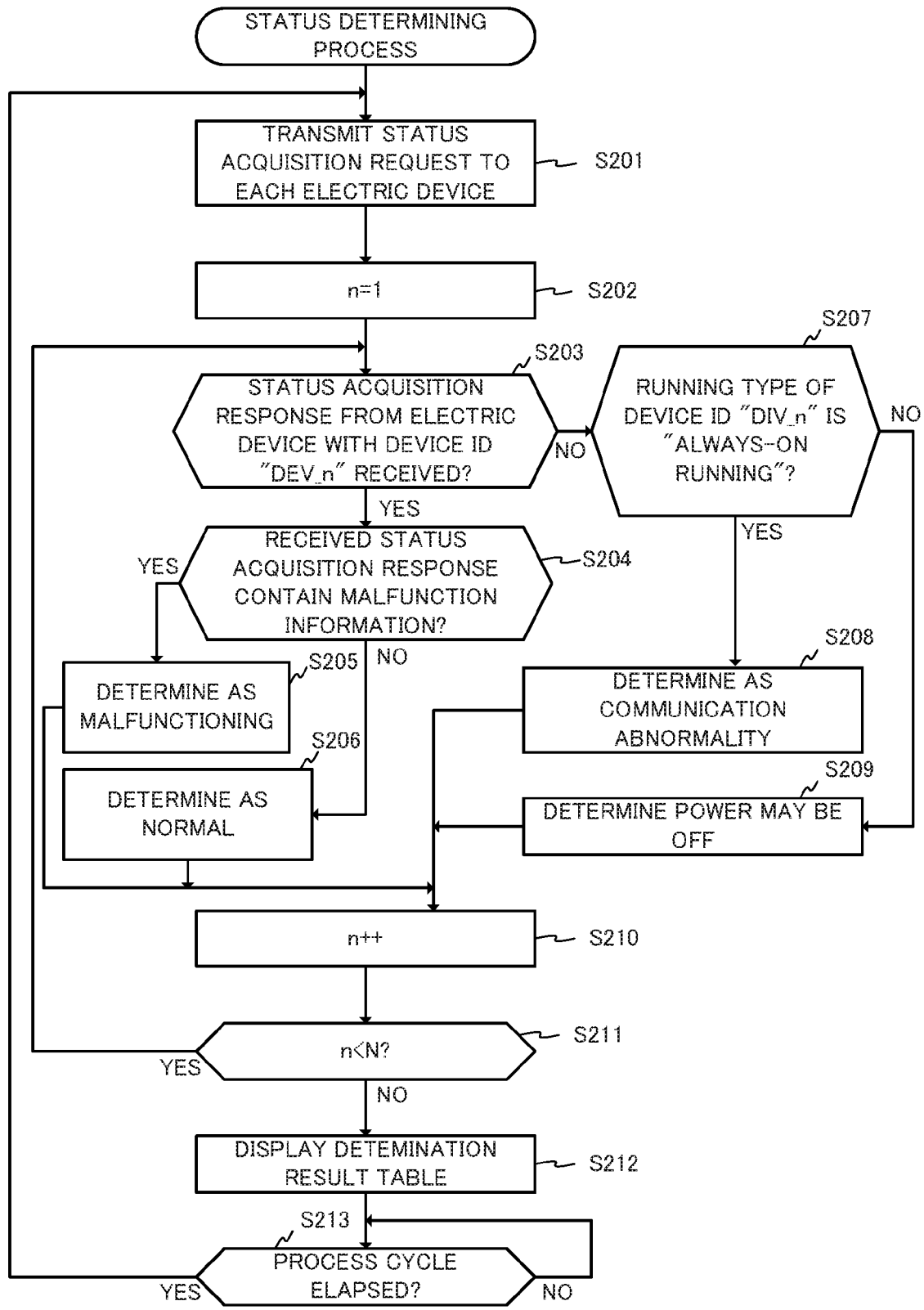
FIG. 9 shows an example of a flowchart of a status determining process according to the first embodiment.

Next, a status determining process executed by the monitoring device 300 is described. FIG. 9 is an example of a flowchart of the status determining process executed by the controller 310 of the monitoring device 300. The status determining process is executed by, for example, the CPU of the controller 310 reading the program that is stored in the ROM. In addition, the status determining process starts upon, for example, acceptance of an operation input that is received from the user via the input hardware 340 and instructs the start of the status determining process.

First, the status acquisition request transmitter 312 transmits the status acquisition request to each electric device 100 (step S201). Note that, in this process, as an example, the status acquisition request transmitter 312 transmits the respective status acquisition requests to the electric devices 100 that have respective device IDs "DEV_1" to "DEV_N" (where N is the total number of the electric devices 100).

Next, the determiner 313 sets a counter n to an initial value that is "1" (step S202).

Subsequently, the determiner 313 determines whether or not the status acquisition response has been received from the electric device 100 having the device ID "DEV_n" (step S203). More specifically, the determiner 313 determines whether or not, after the status acquisition request is transmitted to the electric device 100 in step S201, the status acquisition response is received from that electric device 100 within a time period set beforehand by the user or the like.

When determining that the status acquisition response has been received from the electric device 100 having the device ID "DEV_n" (step S203: YES), the determiner 313 determines whether or not malfunction information indicating that the electric device 100 having the device ID "DEV_n" is malfunctioning is contained in the received status acquisition response (step S204).

When determining that the received status acquisition response contains the malfunction information (step S204: YES), the determiner 313 determines that the electric device 100 having the device ID "DEV_n" is malfunctioning (step S205). Subsequently, the determiner 313 records the device ID "DEV_n" in the RAM in association with the determination result indicating the malfunction status. Next, the determiner 313 proceeds to the processing of step S210.

When determining that the received status acquisition response does not contain the malfunction information (step S204: NO), the determiner 313 determines that the electric device 100 having the device ID "DEV_n" is running normally (step S206). Then, the determiner 313 records the device ID "DEV_n" in the RAM in association with the determination result indicating the normally running status. Subsequently, the determiner 313 proceeds to the processing of step S210.

When determining that the status acquisition response is not received from the electric device 100 having the device ID "DEV_n" (step S203: NO), the determiner 313 refers to the running type table 321 and determines whether or not the running type corresponding to the device ID "DEV_n" is "always-ON running" (step S207).

When determining that the running type corresponding to the device ID "DEV_n" is "always-ON running" (step S207: YES), the determiner 313 determines that an abnormality exists in the communication between the electric device 100 having the device ID "DEV_n" and the monitoring device 300 (step S208). Next, the determiner 313 records the device ID "DEV_n" in the RAM in association with the determination result indicating the existence of an abnormality in the communication. Subsequently, the determiner 313 proceeds to the processing of step S210.

When determining that the running type corresponding to the device ID "DEV_n" is not "always-ON running" (step S207: NO), the determiner 313 determines that the status of the electric device 100 having the device ID "DEV_n" may be OFF (step S209). Then, the determiner 313 records the device ID "DEV_n" in the RAM in association with the determination result indicating the possibility of the OFF status. Subsequently, the determiner 313 proceeds to the processing of step S210.

Next, the determiner 313 increments the counter n (step S210), and determines whether or not the value of the counter n is less than the total number N of the electric devices 100 (step S211).

When determining that the counter n is less than N (step S211: YES), the determiner 313 returns the process to step S203, and repeats the processing of the subsequent steps again.

When determining that the counter n is not less than N (step S211: NO), the presenter 314 generates the determination result table 353 based on each device ID recorded in the RAM and the corresponding determination result, and displays the determination result table 353 on the screen 351 of the output hardware 350 (step S212).

Then, the determiner 313 determines whether or not a process cycle has elapsed after the status acquisition request is transmitted to the electric device 100 in step S201 (step S213). Note that the "process cycle" is a time interval between the respective processes P2 when the process P2 illustrated in FIG. 7 is repeated at a predetermined cycle. The determiner 313 stands by (step S213: NO) until the process cycle has elapsed. In addition, when determining that the process cycle has elapsed (step S213: YES), the determiner 313 returns the process to step S201, and repeats the processing of the subsequent steps again.

As described above, the monitoring device 300 of this embodiment determines the status of the electric device 100 based on the presence or absence of the status acquisition response from the electric device 100 and the running type of the electric device 100 set by the user. Hence, even when the electric device 100 does not respond to the request to acquire the status of the electric device 100, it is possible to accurately determine whether such an event is due to an abnormality existing in the communication, or is due to the electric device 100 being OFF and thus failing to perform communication. Therefore, the monitoring device 300 is capable of determining the status of the electric device 100 more precisely.

Second Embodiment

Next, a monitoring system 1 according to a second embodiment of the present disclosure is described. In the above first embodiment, the monitoring device 300 acquires the type of running of each electric device 100 from user input. In this second embodiment, as another method of acquiring the running type, an example case is described in which the running type of an electric device 100 is acquired from a communication adaptor 200. Note that configurations the same as those of the first embodiment are denoted by the same reference signs, and detailed descriptions thereof are omitted.

Figure 10:
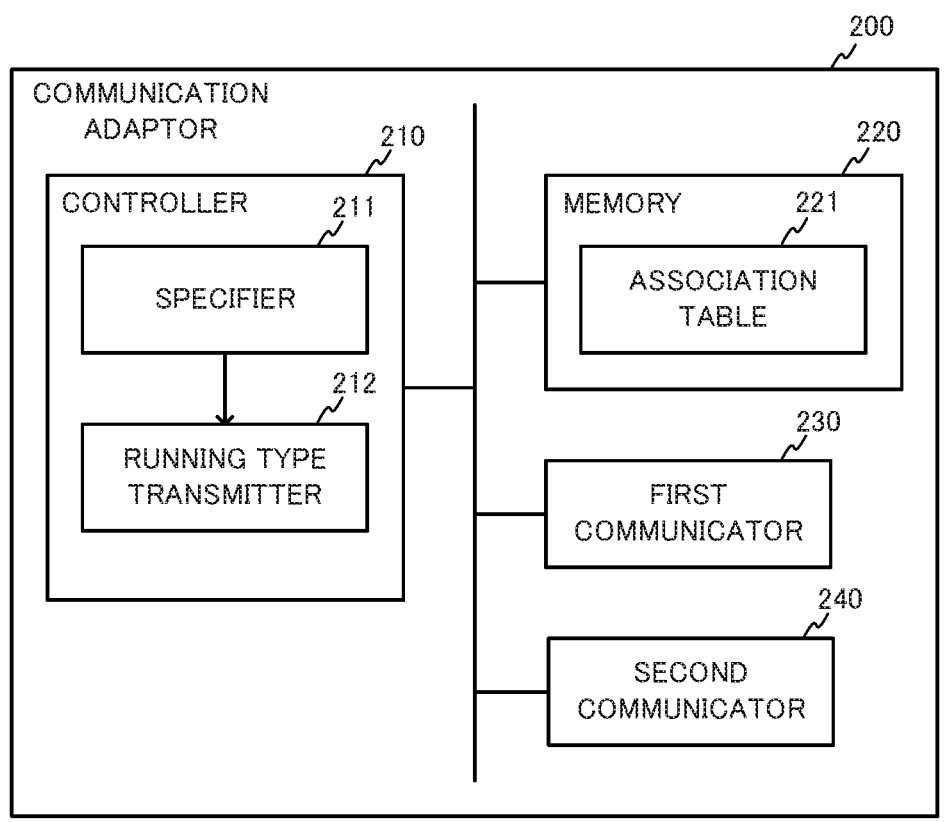
FIG. 10 is a schematic block diagram illustrating an example of a configuration of a communication adaptor according to a second embodiment.

FIG. 10 illustrates an example of a configuration of a communication adaptor 200 according to this embodiment. As illustrated in FIG. 10, the communication adaptor 200 includes a controller 210, a memory 220, a first communicator 230, and a second communicator 240.

The controller 210 includes, for example, a CPU, a ROM that stores a program to be executed by the CPU, a RAM that temporarily stores data generated by the CPU, and a timer that counts the current time. The controller 210 controls the entire communication adaptor 200.

The memory 220 includes a writable memory device, such as a hard disk drive, a flash memory or an SSD. More specifically, the memory 220 stores an association table 221 in which the electric device 100 and the running type are associated with each other.

The first communicator 230 includes an interface to exchange data with the electric device 100.

The second communicator 240 includes an interface to exchange data with the network N.

Next, functions of the controller 210 in the communication adaptor 200 are described. FIG. 10 is a block diagram illustrating an example of a functional configuration of the controller 210. As illustrated in FIG. 10, the controller 210 functions as a specifier 211 and a running type transmitter 212.

The specifier 211 receives, from the electric device 100 connected with the communication adaptor 200, the device ID of that electric device 100, and refers to the association table 221 to specify the running type associated with the received device ID.

More specifically, upon turning ON of the electric device 100 and the supply of power from the electric device 100 to the communication adaptor 200, the specifier 211 receives the device ID of the electric device 100. Alternatively, the specifier 211 may receive the device ID of the electric device 100 from the electric device 100 periodically.

The running type transmitter 212 transmits, to the monitoring device 300, the running type specified by the specifier 211 in a manner associated with the received device ID.

Note that a communication protocol that is ECHONET Lite is applicable between the communication adaptor 200 and the monitoring device 300. In this case, the running type transmitter 212 may set, in a communication telegram message to be transmitted to the monitoring device 300, an INF (INF to give notification of a property value) in an ECHONET Lite service (ESV), allocate the "running type" to the user definition area in an ECHONET property (EPC), and set a value indicating "always-ON running" or "run by user operation". By transmitting the communication telegram message set as described above to the monitoring device 300, the running type transmitter 212 is able to notify the monitoring device 300 of the running type of the electric device 100 connected with the communication adaptor 200.

Figure 11:
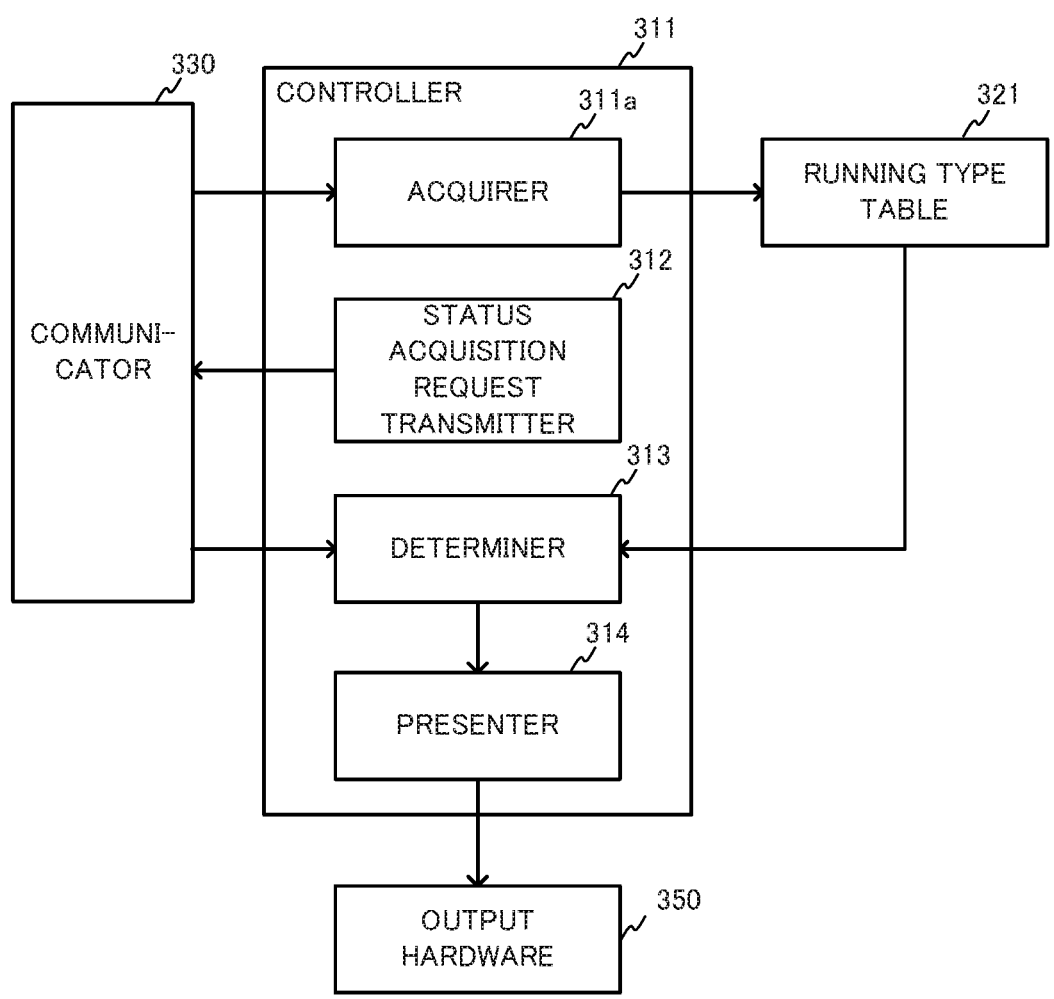
FIG. 11 is a schematic block diagram illustrating an example of a functional configuration of a monitoring device according to the second embodiment.

Next, functions of the controller 310 of the monitoring device 300 are described. As illustrated in FIG. 11, instead of the acquirer 311 of the first embodiment illustrated in FIG. 3, the controller 310 functions as an acquirer 311a.

The acquirer 311a acquires the running type of the electric device 100 from the communication adaptor 200. More specifically, the acquirer 311a stores, in the running type table 321 in the memory 320, the running type and the device ID that are both contained in data transmitted by the running type transmitter 212 of the communication adaptor 200.

As described above, according to the monitoring system 1 of this embodiment, the communication adaptor 200 specifies, from information on the electric device 100 connected with the communication adaptor 200, the running type of the electric device 100. Then, the communication adaptor 200 notifies the monitoring device 300 of the specified running type. Therefore, the user does not have to set the running type for each electric device 100.

Third Embodiment

Next, a monitoring system 1 according to a third embodiment of the present disclosure is described. In this third embodiment, as an example of a method of acquiring the type of running that is different from the above first and second embodiments, an example case is described in which the type of running of an electric device 100 is acquired based on a frequency of change in the presence or absence of a response to a status acquisition request. Note that configurations the same as those of the first and second embodiments are denoted by the same reference sign, and detailed descriptions are omitted.

Figure 12:
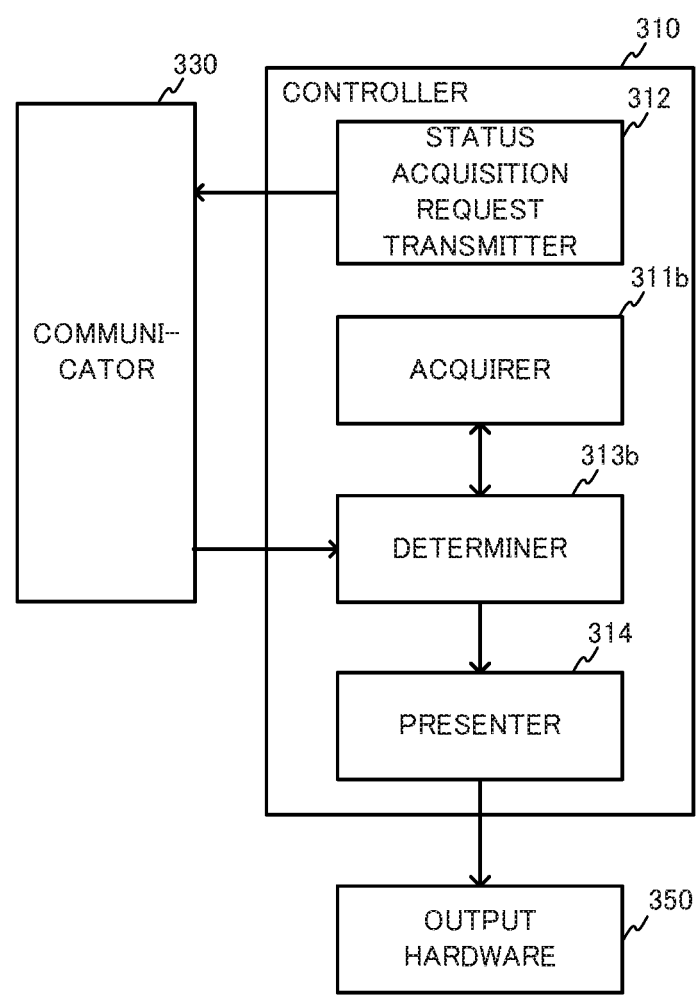
FIG. 12 is a schematic block diagram illustrating an example of a functional configuration of a monitoring device according to a third embodiment.

Functions of a controller 310 of a monitoring device 300 in this embodiment are described below. FIG. 12 is a block diagram illustrating an example of a functional configuration of the controller 310. As illustrated in FIG. 12, instead of the acquirer 311 and the determiner 313 of the first embodiment illustrated in FIG. 3, the controller 310 functions as an acquirer 311b and a determiner 313b.

The acquirer 311b calculates the frequency of change in the presence or absence of a response to the status acquisition request transmitted by the status acquisition request transmitter 312, and when the calculated frequency is less than a predetermined threshold, the acquirer 311b acquires the "always-ON running" type as the running status of the electric device 100. In addition, when the calculated frequency is equal to or greater than the threshold, the acquirer 311b acquires the "run by user operation" type as the running status of the electric device 100. In this case, an example of a threshold is once per year or once per month.

When the determiner 313b does not receive from the electric device 100 a response to the status acquisition request transmitted by the status acquisition request transmitter 312, and the running type of the electric device 100 acquired by the acquirer 311b is not "always-ON running", the determiner 313b determines that there is a possibility that the status of the electric device 100 is OFF.

In addition, when the determiner 313b does not receive from the electric device 100 a response to the status acquisition request transmitted by the status acquisition request transmitter 312, and the running type of the electric device 100 acquired by the acquirer 311b is "always-ON running", the determiner 313b determines that an abnormality exists in the communication between the electric device 100 and the monitoring device 300.

Figure 13:
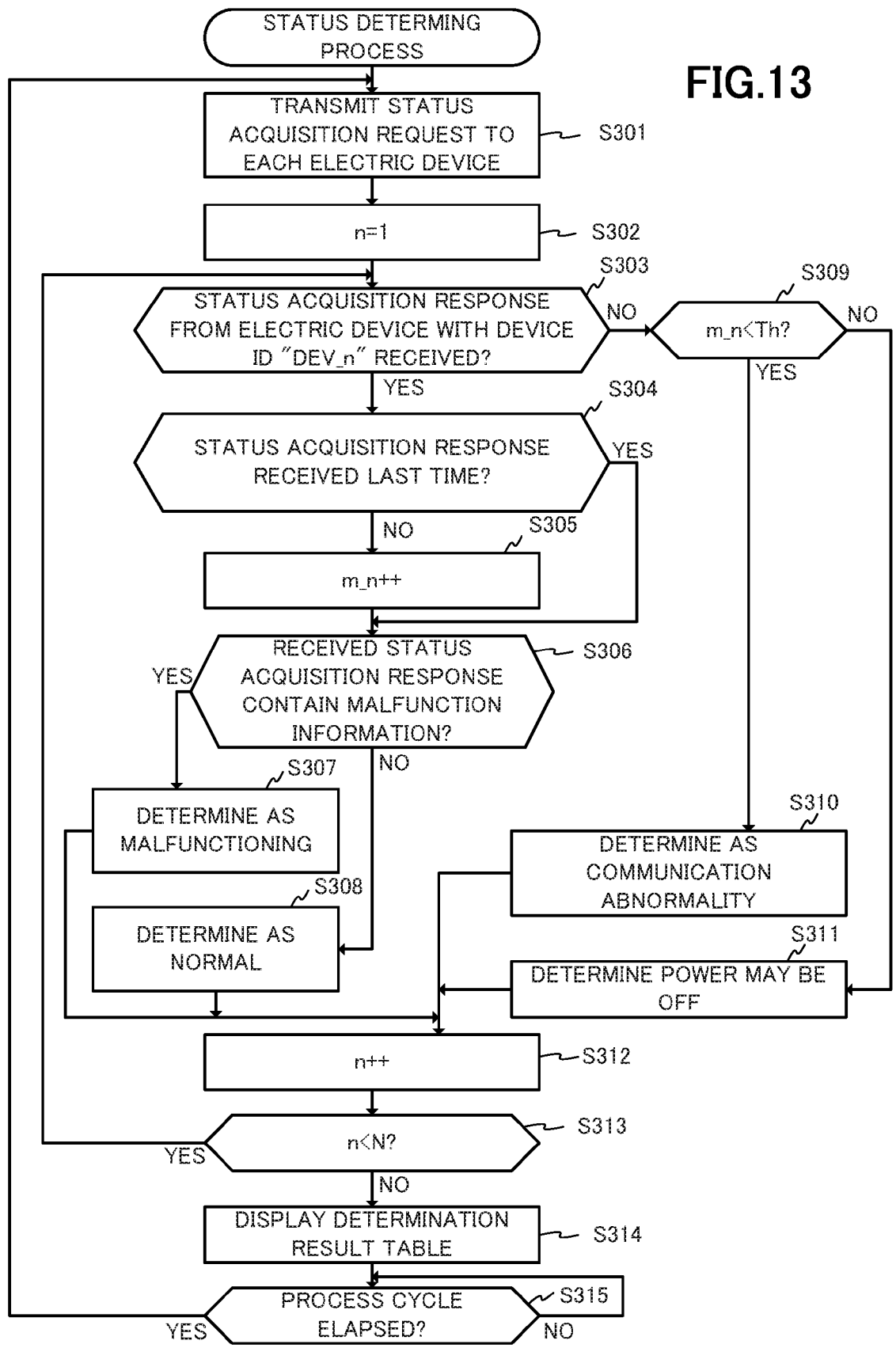
FIG. 13 shows an example of a flowchart of a status determining process according to the third embodiment.

Next, a status determining process executed by the monitoring device 300 is described below. FIG. 13 is an example of a flowchart of the status determining process executed by the controller 310 of the monitoring device 300. The status determining process is executed by, for example, the CPU of the controller 310 reading the program stored in the ROM. In addition, the status determining process starts, upon acceptance of the operation input that is received from the user via the input hardware 340 and instructs the start of the status determining process.

First, in steps S301 to S303, the same processing as that of steps S201 to S203 of the status determining process according to the first embodiment illustrated in FIG. 9 is executed.

When the determiner 313b determines that the status acquisition response has been received from the electric device 100 having the device ID "DEV_n" (step S303: YES), the acquirer 311b determines whether or not, in response to the status acquisition request transmitted last time to the electric device 100 having the device ID "DEV_n", the status acquisition response has been received from that electric device 100 (step S304). When the acquirer 311b determines that the status acquisition response has been received (step S304: YES), the determiner 313b proceeds to the processing of step S306.

When determining that the status acquisition response has not been received (step S304: NO), the acquirer 311b increments a counter m_n (step S305). In this case, the counter m_n is a counter for the determiner 313b to count the number of times of changes from a condition in which the status acquisition response has not been received from the electric device 100 having the device ID "DEV_n" to a condition in which such a response is received within a unit time period (for example, a year). That is, the counter m_n indicates, for the electric device 100 with the device ID "DEV_n", a frequency of change in the presence or absence of the response to the status acquisition request transmitted by the status acquisition request transmitter 312. Note that the counter m_n is reset with a unit time interval, and returns to zero.

Next, in step S306 to S308, the same processing as that of steps S204 to S206 of the status determining process according to the first embodiment illustrated in FIG. 9 is executed.

When the determiner 313b determines that the status acquisition response has not been received from the electric device 100 having the device ID "DEV_n" (step S303: NO), the acquirer 311b determines whether or not the counter m_n is less than a threshold Th (for example, one) (step S309).

When the acquirer 311*b* determines that the counter m_n is less than the threshold Th (step S309: YES), that is, when the acquirer 311*b* determines that the running type corresponding to the device ID "DEV_n" is "always-ON running", the determiner 313*b* determines that an abnormality exists in the communication between the electric device 100 having the device ID "DEV_n" and the monitoring device 300 (step S310). Next, the determiner 313*b* records the device ID "DEV_n" in the RAM in association with the determination result indicating the existence of an abnormality in the communication. Subsequently, the determiner 313*b* proceeds to the processing of step S312.

When the acquirer 311*b* determines that the counter m_n is equal to or greater than the threshold Th (step S309: NO), that is, when the acquirer 311*b* determines that the running type corresponding to the device ID "DEV_n" is "run by user operation", the determiner 313*b* determines that there is a possibility that the electric device 100 having the device ID "DEV_n" is OFF (step S311). Then, the determiner 313*b* records the device ID "DEV_n" in the RAM in association with the determination result indicating that there is a possibility that status of such an electric device is OFF. Subsequently, the determiner 313*b* proceeds to the processing of step S312.

Next, in steps S312 to S315, the same processing as that in steps S210 to S213 of the status determining process according to the first embodiment illustrated in FIG. 9 is executed.

As explained above, according to the monitoring system 1 of this embodiment, the monitoring device 300 is capable of acquiring the running type of the electric device 100 based on the frequency of change in the presence or absence of a response to the status acquisition request. Therefore, the user does not have to set beforehand the running type for each electric device 100 in the communication adaptor 200 or the monitoring device 300 beforehand.

Fourth Embodiment

Next, a monitoring system 1 according to a fourth embodiment of the present disclosure is described below. In the foregoing first to third embodiments, the monitoring device 300 determines the status of the electric device 100 based on the presence or absence of a response from the electric device 100 to the status acquisition request, and the type of running of the electric device 100. In this fourth embodiment, an example case is described in which a monitoring device 300 determines the status of an electric device 100 further based on a change in ON-OFF status of the electric device 100. Note that configurations the same as those of the first to third embodiments are denoted by the same reference signs, and detailed descriptions thereof are omitted.

Figure 14:
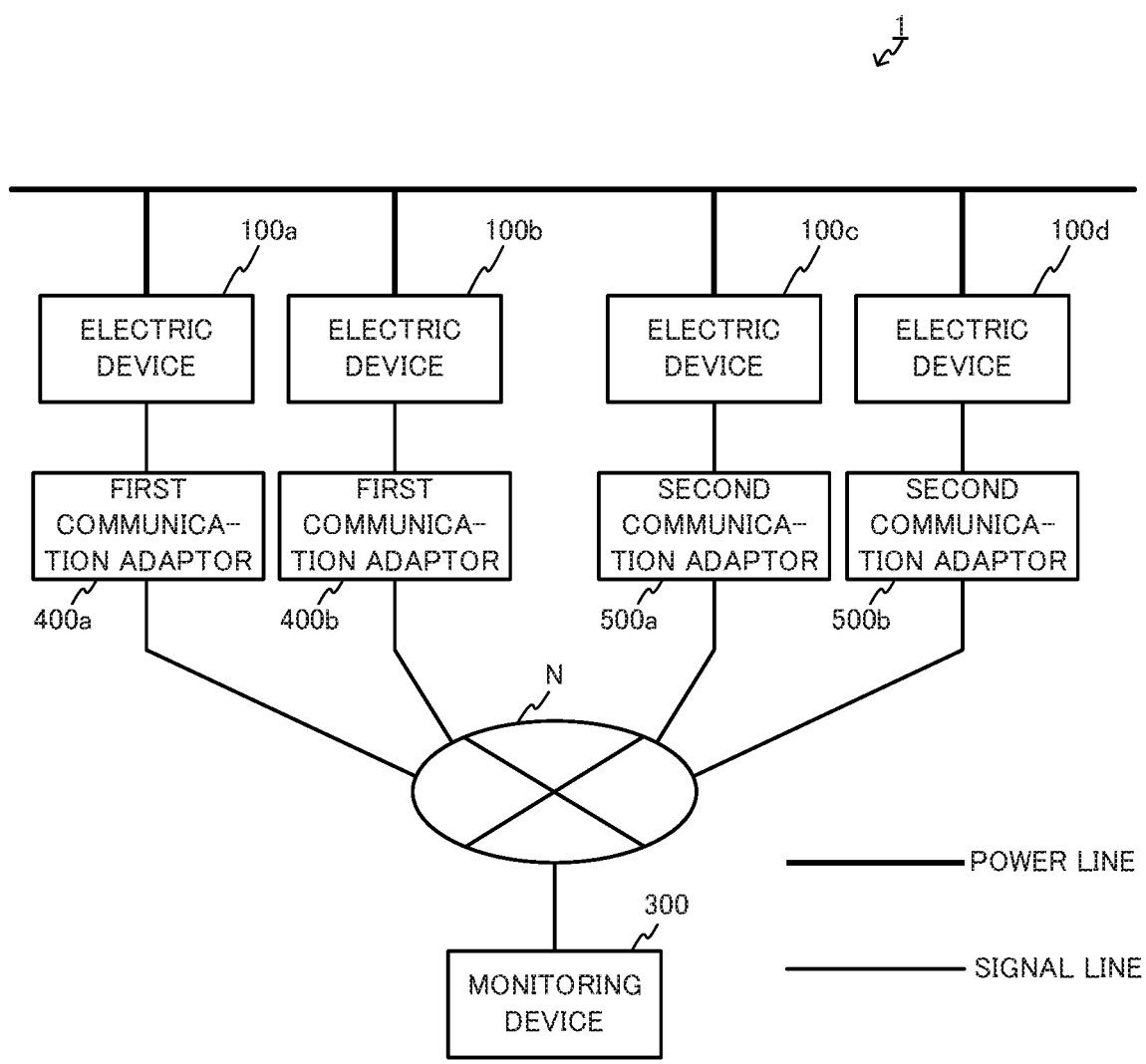
FIG. 14 is a schematic block diagram illustrating an example of a configuration of a monitoring system according to a fourth embodiment.

FIG. 14 is a schematic block diagram illustrating an example of a configuration of the monitoring system 1 according to the fourth embodiment of the present disclosure. The monitoring system 1 illustrated in FIG. 14 differs from the monitoring systems 1 of the first to third embodiments illustrated in FIG. 1 in that electric devices 100*a* and 100*b* among electric devices 100*a* to 100*d* are connected with first communication adaptors 400*a* and 400*b*, respectively, and electric devices 100*c* and 100*d* are connected with second communication adaptors 500*a* and 500*b*, respectively.

The first communication adaptors 400*a* and 400*b* employ the same configuration as the communication adaptors 200*a* and 200*b* of any of the first to third embodiments. Note that in the following description, the communication adaptors 400*a* and 400*b* are collectively referred to as a first communication adaptor 400.

The second communication adaptors 500*a* and 500*b* are communicably connected with the network N in a wired or wireless manner. Note that in the following description, the communication adaptors 500*a* and 500*b* are collectively referred to as a second communication adaptor 500.

Figure 15:
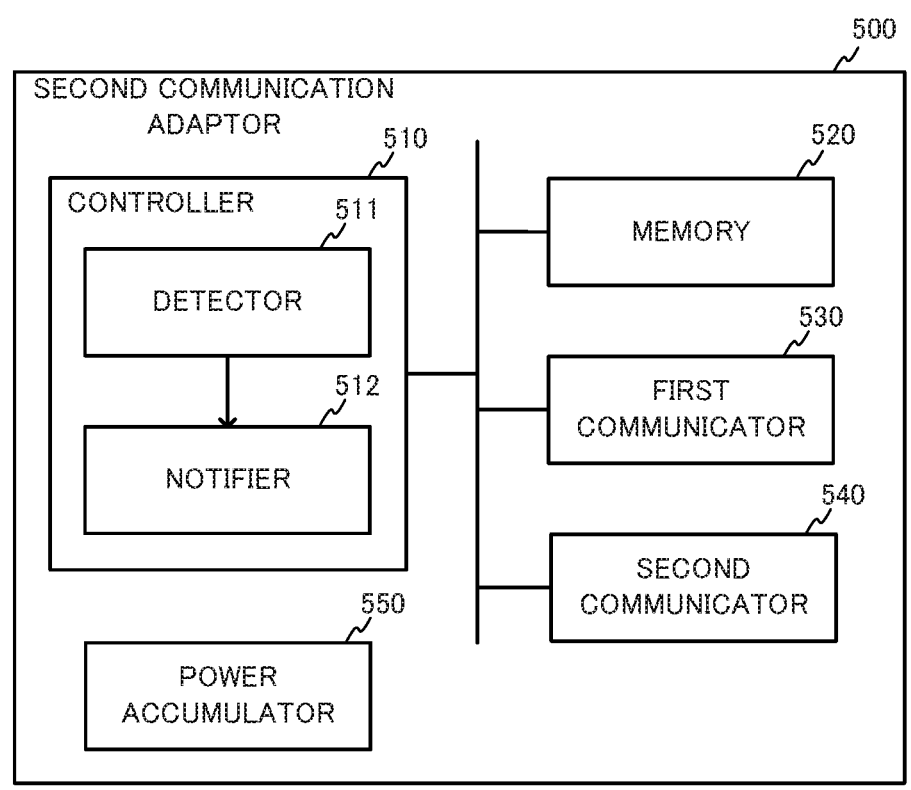
FIG. 15 is a schematic block diagram illustrating an example of a configuration of a second communication adaptor according to the fourth embodiment.

FIG. 15 illustrates an example of a configuration of the second communication adaptor 500 according to this embodiment. As illustrated in FIG. 15, the second communication adaptor 500 includes a controller 510, a memory 520, a first communicator 530, a second communicator 540, and a power accumulator 550.

The controller 510 includes, for example, a CPU, a ROM that stores a program to be executed by the CPU, a RAM that temporarily stores data generated by the CPU, and a timer that counts the current time. The controller 510 controls the entire second communication adaptor 500.

The memory 520 includes a writable memory device, such as a hard disk drive, a flash memory, or an SSD.

The first communicator 530 includes an interface that exchanges data with the electric devices 100*c* or 100*d*.

The second communicator 540 includes an interface that exchanges data with the network N.

The power accumulator 550 functions as a power supply for each component that constructs the second communication adaptor 500 when the supply of power from the electric devices 100*c* and 100*d* that are connected with the respective second communication adaptors 500 is suspended. The power accumulator 550 includes, for example, a small-capacity battery.

Next, functions of the controller 510 of the second communication adaptor 500 are described. As illustrated in FIG. 15, the controller 510 functions as a detector 511 and a notifier 512.

The detector 511 detects power supplied from the electric devices 100*c* and 100*d* that are connected with the respective second communication adaptors 500.

When the presence or absence of the power detected by the detector 511 changes, the notifier 512 notifies the monitoring device 300 of the change in the power supply status of the electric device 100*c* or 100*d* connected with the second communication adaptor 500. More specifically, when the supply of power from the electric device 100*c* or 100*d* to the second communication adaptor is suspended due to the electric device 100*c* or 100*d* being turned OFF no power is detected by the detector 511, and thus the notifier 512 notifies the monitoring device 300 of the change in the status of the electric device 100*c* or 100*d* from ON to OFF. In addition, when the supply of power from the electric device 100*c* or 100*d* to the second communication adaptor 500 starts due to the electric device 100*c* or 100*d* being turned ON, power to be detected by the detector 511 increases, and thus the notifier 512 notifies the monitoring device 300 of the change in the status of the electric device 100*c* or 100*d* from OFF to ON.

Figure 16:
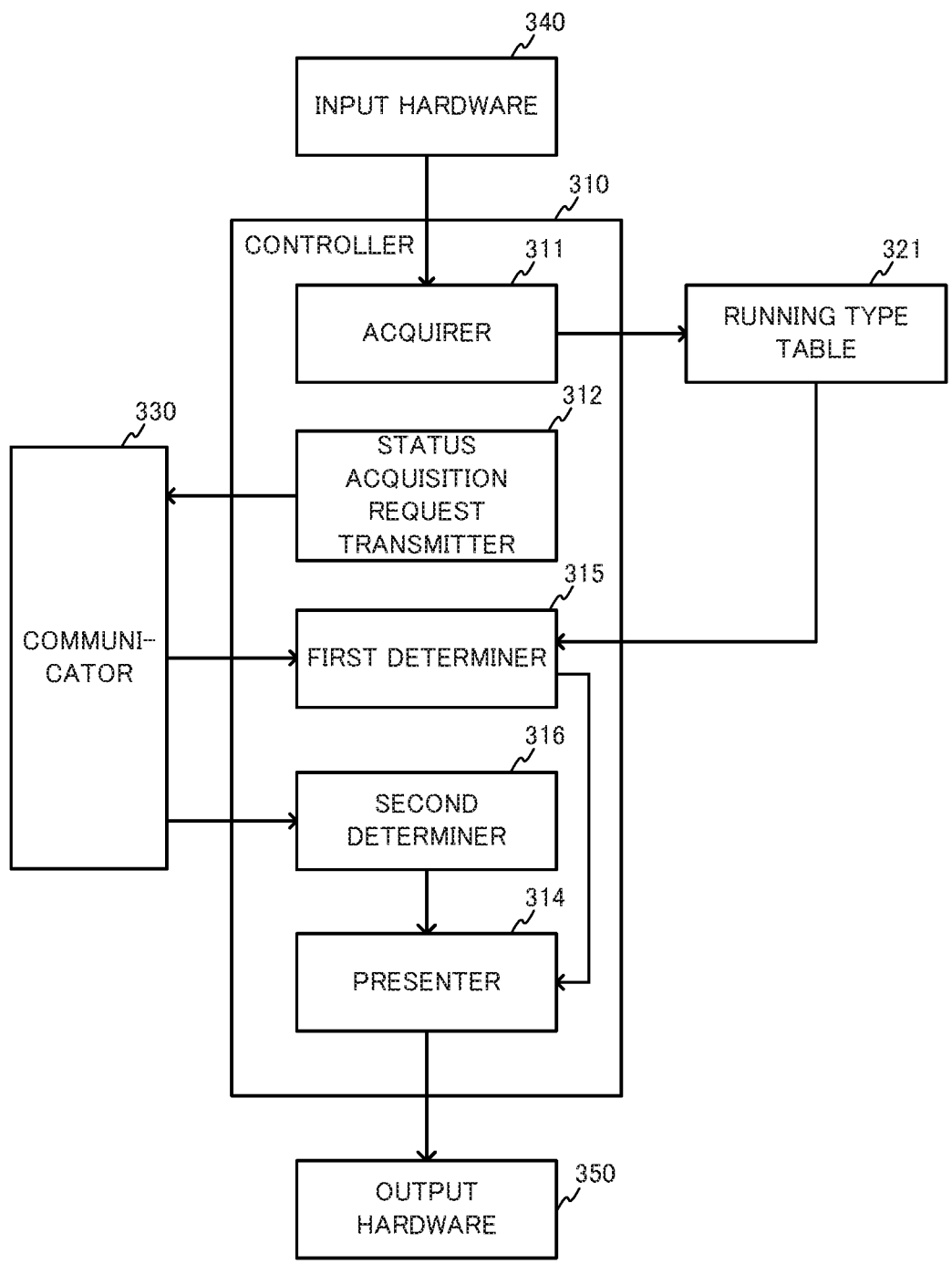
FIG. 16 is a schematic block diagram illustrating an example of a functional configuration of a monitoring device according to the fourth embodiment.

Next, functions of the controller 310 in the monitoring device 300 are described. FIG. 16 is a schematic block diagram illustrating an example of a functional configuration of the controller 310. As illustrated in FIG. 16, instead of the determiner 311 of the first embodiment illustrated in FIG. 3, the controller 310 functions as a first determiner 315 and a second determiner 316.

The first determiner 315 functions similarly to the determiner 311 of the first embodiment in a determination on the status of the electric devices 100a and 100b that are connected with the respective first communication adaptors 400.

The second determiner 316 updates flags indicating the power supply statuses of the electric devices 100c and 100d based on the notification received from the respective second communication adaptors 500, and determines the statuses of the electric devices 100c and 100d based on the respective flags and responses from the respective electric devices 100c and 100d to the status acquisition requests transmitted by the status acquisition request transmitter 312.

When, for example, the second determiner 316 does not receive from the electric device 100c a response to the status acquisition request transmitted by the status acquisition request transmitter 312, and the flag indicating the power supply status of the electric device 100c is "turned OFF", the second determiner 316 determines that the status of the electric device 100c is OFF.

Further, when the second determiner 316 does not receive from the electric device 100c a response to the status acquisition request transmitted by the status acquisition request transmitter 312, and the flag indicating the power supply status of the electric device 100c is "turned ON", the second determiner 316 determines that an abnormality exists in the communication between the electric device 100c and the monitoring device 300.

Still further, when the second determiner 316 receives from the electric devices 100c and 100d respective responses to the status acquisition requests transmitted by the status acquisition request transmitter 312, the second determiner 316 also determines the respective statuses of the electric devices 100c and 100d in a manner similar to that of the first determiner 315.

Figure 17:
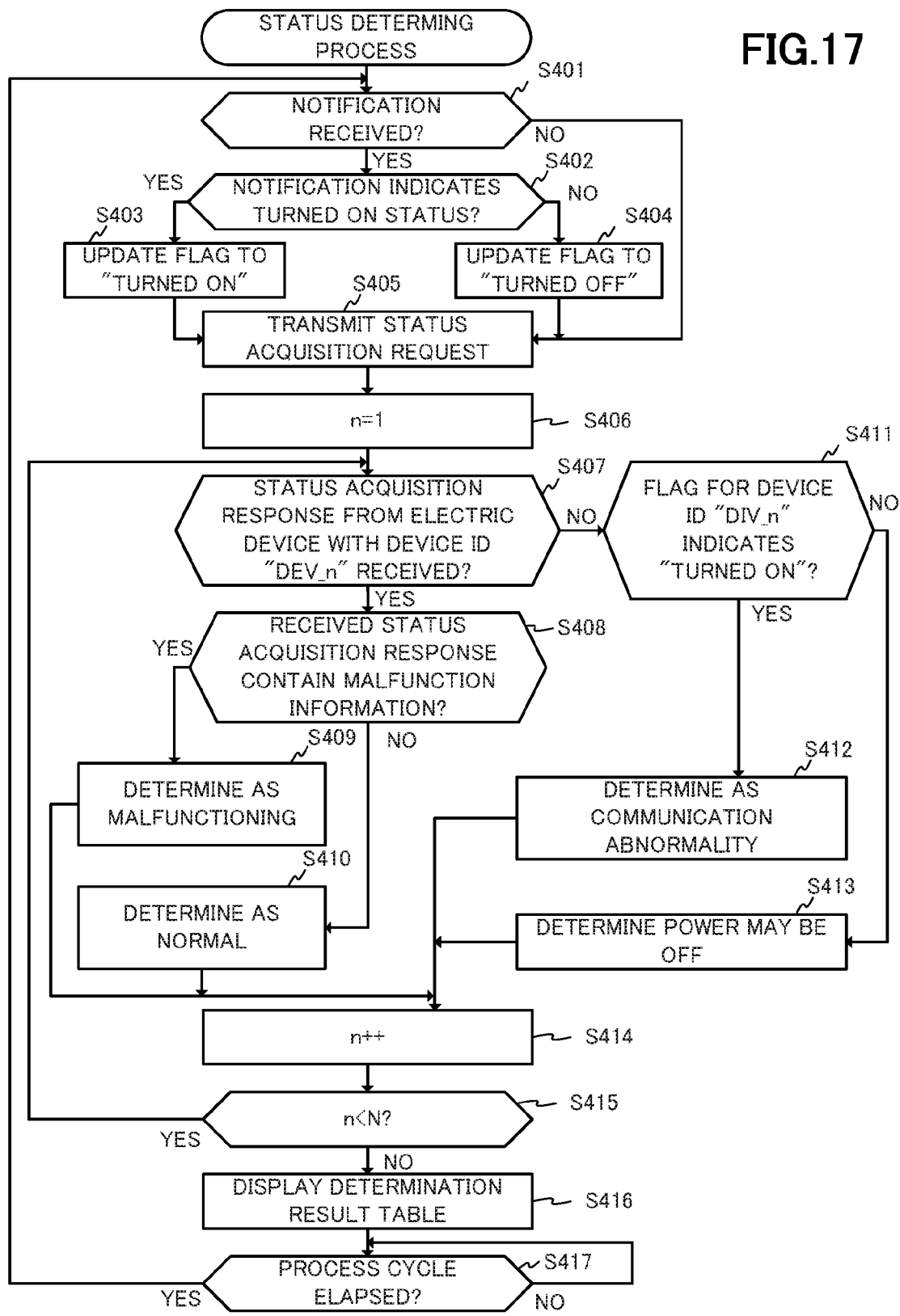
FIG. 17 shows an example of a flowchart of a status determining process according to the fourth embodiment.

Next, a status determining process executed by the monitoring device 300 is described. FIG. 17 is an example of a flowchart of the status determining process executed by the controller 310 of the monitoring device 300. Note that in the below-described status determining process illustrated in FIG. 17, the monitoring device 300 determines the respective statuses of the electric devices 100c and 100d connected with the respective second communication adaptors 500. In addition, in this embodiment, the monitoring device 300 determines the respective statuses of the electric devices 100a and 100b connected with the respective first communication adaptors 400, through a similar process to the status determining process of the first embodiment illustrated in FIG. 9.

The status determining process illustrated in FIG. 17 is executed by, for example, the CPU of the controller 310 reading the program that is stored in the ROM. In addition, the status determining process starts upon, for example, acceptance of the operation input that is received from the user via the input hardware 340 and instructs the start of the status determining process. Note that in the following description, as an example, the electric devices 100c and 100d have device IDs, "DEV_1" and "DEV_2", respectively.

First, the second determiner 316 determines whether or not a notification of a change in the power supply status of the electric device 100c or 100d is received from the second communication adaptor 500 (step S401). When determining that the notification has not been received from the second communication adaptor 500 (step S401: NO), the second determiner 316 proceeds to the processing of step S405.

When determining that the notification has been received from the second communication adaptor 500 (step S401: YES), the second determiner 316 determines whether or not the received notification indicates the turned ON status (step S402).

When determining that the received notification indicates the turned ON status (step S402: YES), the second determiner 316 updates, to a value indicating "turned ON", the flag corresponding to the electric device 100c or 100d connected with the second communication adaptor 500 that has transmitted the notification (step S403). Next, the second determiner 316 proceeds to the processing of step S405.

When determining that the received notification does not indicate the turned ON status (step S402: NO), the second determiner 316 updates the flag corresponding to the electric device 100c or 100d connected with the second communication adaptor 500 that has transmitted the notification to a value indicating "turned OFF" (step S404). Then, the second determiner 316 proceeds to the processing of step S405.

Next, in steps S405 to S410, the same processing as that in steps S201 to S206 of the status determining process according to the first embodiment illustrated in FIG. 9 is executed.

When determining that the status acquisition response has not been received from the electric device 100c or 100d having the device ID "DEV_n" (step S407: NO), the second determiner 316 determines whether or not the flag corresponding to the device ID "DEV_n" indicates "turned ON" (step S411).

When the second determiner 316 determines that the flag corresponding to the device ID "DEV_n" indicates "turned ON" (step S411: YES), the second determiner 316 determines that an abnormality exists in the communication between the device 100 having the device ID "DEV_n" and the monitoring device 300 (step S412). Then, the second determiner 316 records the device ID "DEV_n" in the RAM in association with the determination result indicating the existence of an abnormality in the communication. Subsequently, the second determiner 316 proceeds to the processing of step S414.

When the second determiner 316 determines that the flag corresponding to the device ID "DEV_n" does not indicate "turned ON" (step S411: NO), the second determiner 316 determines that the status of the electric device 100 having the device ID "DEV_n" is OFF (step S413). Then, the second determiner 316 records the device ID "DEV_n" in the RAM in association with the determination result indicating the possibility of the OFF status. Subsequently, the second determiner 316 proceeds to the processing of step S414.

Next, in steps S414 to S417, the same processing as that in steps S210 to S213 of the status determining process according to the first embodiment illustrated in FIG. 9 is executed.

As described above, the monitoring device 300 of this embodiment is capable of accurately determining the power supply statuses of the electric devices 100c and 100d, by receiving from the respective second communication adaptors 500 notifications that the power supply statuses of the electric devices 100c and 100d have changed. Hence, when the electric devices 100c and 100d do not respond to the status acquisition requests thereto, it is possible to accurately determine whether or not such an event is due to the electric device 100 being OFF and thus failing to perform communication.

Fifth Embodiment

Next, a monitoring system 1 according to a fifth embodiment of the present disclosure is described. In the above fourth embodiment, the monitoring device 300 receives notifications of changes in the power supply statuses of the electric devices 100c and 100d from the respective second communication adaptors 500. In the fifth embodiment, another example case is described in which a monitoring device 300 acquires changes in the power supply statuses of electric devices 100c and 100d. Note that configurations the same as those of the first to fourth embodiments are denoted by the same reference signs, and detailed descriptions thereof are omitted.

Figure 18:
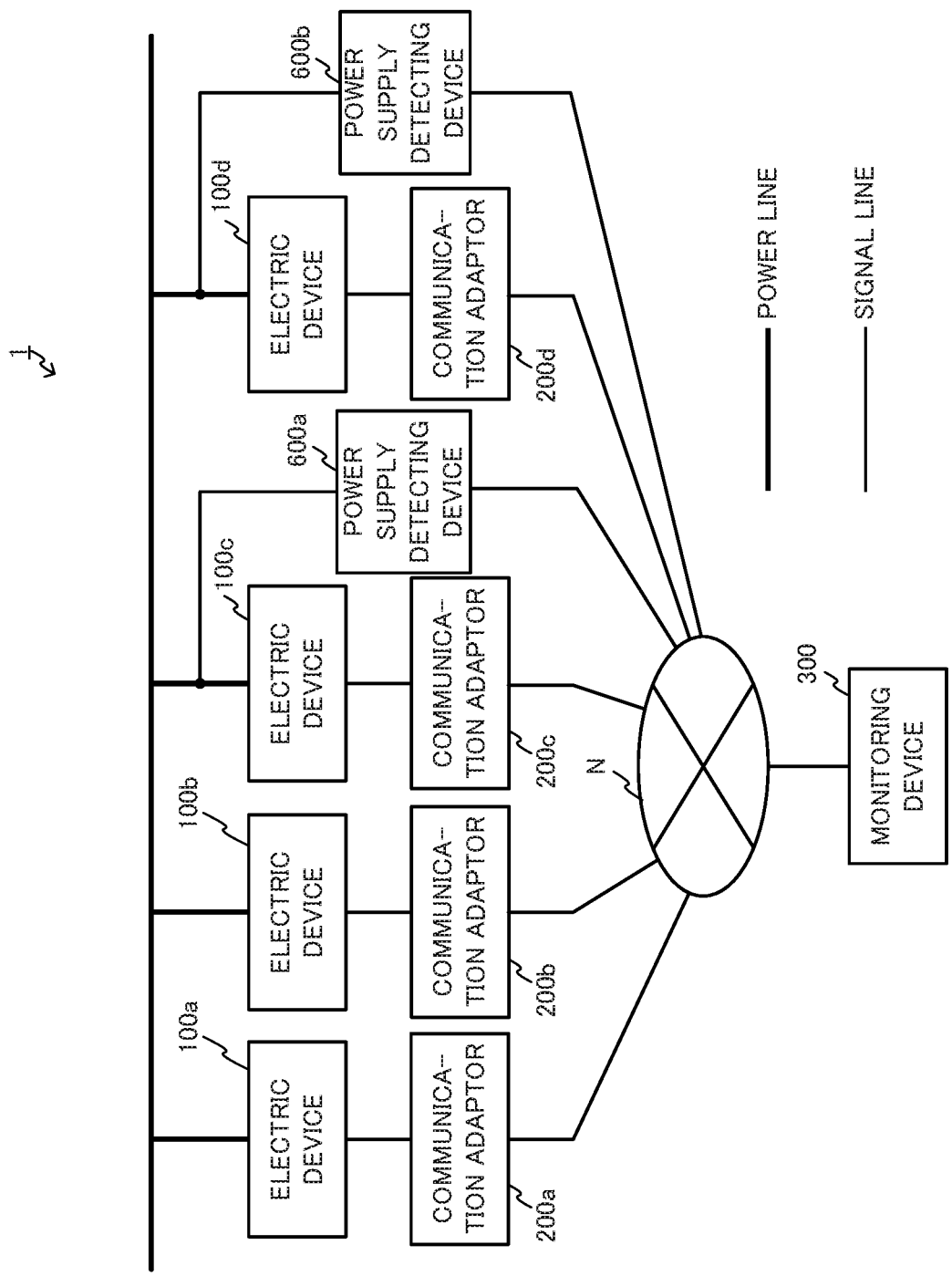
FIG. 18 is a schematic block diagram illustrating an example of a configuration of a monitoring system according to a fifth embodiment.

FIG. 18 is a schematic block diagram illustrating an example of a configuration of a monitoring system 1 according to the fifth embodiment of the present disclosure. The monitoring system 1 illustrated in FIG. 18 differs from the monitoring system 1 according to the first embodiment illustrated in FIG. 1 in that power supply detecting devices 600a and 600b are further provided.

The power supply detecting devices 600a and 600b detect electric currents supplied to the electric devices 100c and 100d, respectively, from the power lines. The power supply detecting devices 600a and 600b are communicably connected with the network N in a wired or wireless manner. Note that in the following description, the power supply detecting devices 600a and 600b are collectively referred to as a power supply detecting device 600.

Figure 19:
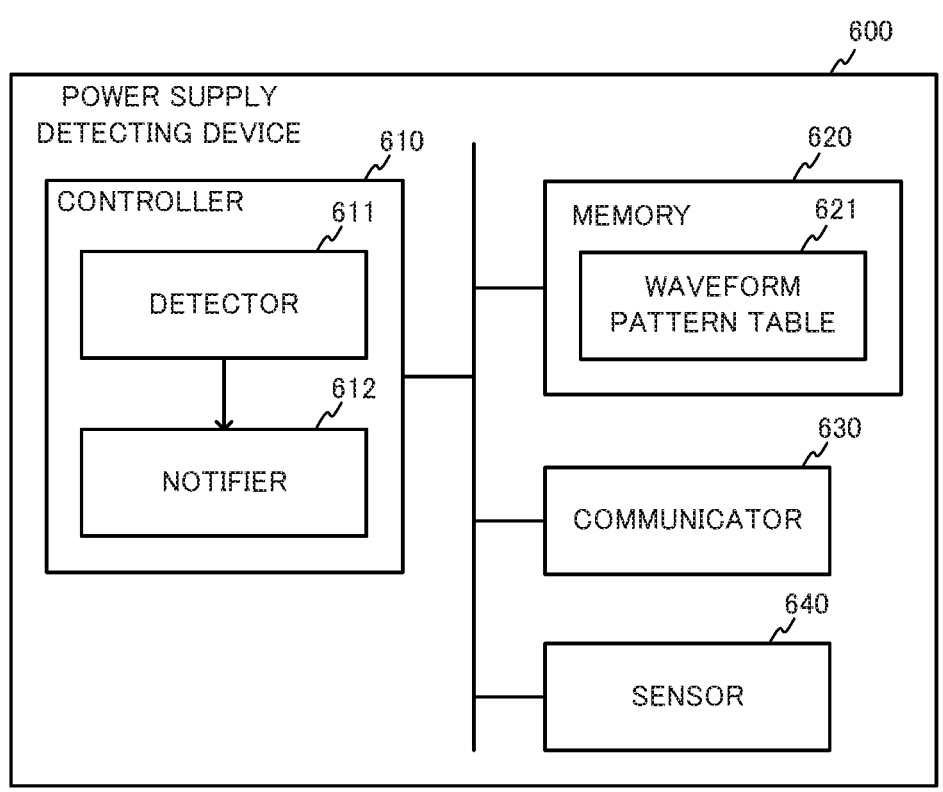
FIG. 19 is a schematic block diagram illustrating an example of a configuration of a power supply detecting device according to the fifth embodiment.

FIG. 19 illustrates an example of a configuration of the power supply detecting device 600 according to this embodiment. As illustrated in FIG. 19, the power supply detecting device 600 includes a controller 610, a memory 620, a communicator 630, and a sensor 640.

The controller 610 includes, for example, a CPU, a ROM that stores a program to be executed by the CPU, a RAM that temporarily stores data generated by the CPU, and a timer that counts the current time. The controller 610 controls the entire power supply detecting device 600.

The memory 620 includes a writable memory device, such as a hard disk drive, a flash memory, or an SSD.

The communicator 630 includes an interface that exchanges data with the network N.

The sensor 640 includes a current sensor that detects electric currents supplied to the electric devices 100c and 100d from the power lines.

Next, functions of the controller 610 in the power supply detecting device 600 are described. As illustrated in FIG. 19, the controller 610 functions as a detector 611 and a notifier 612.

The detector 611 detects through the sensor 640 the electric currents supplied to the electric device 100c and 100d from the power lines.

When the waveform of the electric current detected by the detector 611 matches with a waveform pattern indicating a change in the power supply status, the notifier 612 notifies the monitoring device 300 of a change in the power supply status of the electric device 600c or 600d associated with the power supply detecting device 600. More specifically, as a waveform pattern, each waveform of electric current that is detected by the detector 611 when the electric device 100c or 100d associated with the power supply detecting device 600 is turned ON or OFF is contained in a waveform pattern table 621 in the memory 620 beforehand. When the waveform of the electric current detected by the detector 611 matches with the waveform pattern in the OFF status that is contained in the waveform pattern table 621, the notifier 612 notifies the monitoring device 300 of a change in the status of the electric device 100c or 100d associated with the power supply detecting device 600 from ON to OFF In addition, when the waveform of the electric current detected by the detector 611 matches with the waveform pattern in the ON status that is contained in the waveform pattern table 621, the notifier 612 notifies the monitoring device 300 of a change in the status of the electric device 100c or 100d associated with the power supply detecting device 600 from OFF to ON.

In the above described configuration, the second determiner 316 of the monitoring device 300 according to this embodiment updates flags indicating the power supply statuses of the electric devices 100c and 100d based on the notifications received from the power supply detecting device 600 instead of the notifications received from the second communication adaptor 500 in the fourth embodiment, and determines the statuses of the electric devices 100c and 100d based on the flags and responses from the electric devices 100c and 100d to the status acquisition requests transmitted by the status acquisition requests transmitter 312. Therefore, similar to the fourth embodiment, the monitoring device 300 according to this embodiment is capable of accurately determining the power supply statuses of the electric devices 100c and 100d. Hence, when the electric devices 100c and 100d do not respond to the status acquisition requests thereto, it is possible to accurately determine whether or not such an event is due to the electric device 100 being OFF and thus failing to perform communication.

In addition, according to this embodiment, an example case is described above in which the electric device 100 is communicably connected with the network N via the communication adaptor 200. However, even when the electric device 100 does not have an interface for connection with the communication adaptor 200 and is connected with the network N without the communication adaptor 200, a notification of a change in the power supply status of such an electric device 100 can be transmitted to the monitoring device 300 by using the power supply detecting device 600.

Note that the program executed by the monitoring device 300 in the foregoing embodiments may be stored and distributed on a non-transitory computer readable recording medium, such as a flexible disk, a compact disk read-only memory (CD-ROM), a digital versatile disk (DVD), or a magneto-optical disk (MO). In addition, by installing the program in an information processing device such as a personal computer or the like, a device that executes the above described processes may be realized.

In addition, the program may be stored in a disk device or the like of a server device on a communication network such as the Internet or the like. Further, such a program may be superimposed on, for example, carrier waves, and may then be downloaded.

When the above described functions are shared by an operating system (OS) or realized by a cooperative work of the OS with an application program, only the non-OS program part may be stored and distributed on a non-transitory recording medium, or may be downloaded.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for a monitoring system that monitors a running status of an electric device.

The invention claimed is:

1. A monitoring system comprising:
a first communication adaptor configured to be communicably connected with an electric device; and
a monitoring device configured to be communicably connected with the electric device via the first communication adaptor and to monitor a status of the electric device, wherein
the monitoring device comprises:
an acquirer configured to acquire a type of running indicating whether or not the status of the electric device is always ON;
a status acquisition request transmitter configured to transmit to the electric device a status acquisition request that requests acquisition of the status of the electric device; and
a first determiner configured to determine the status of the electric device based on a response to the status acquisition request transmitted by the status acquisition request transmitter and the type of running acquired by the acquirer,
the first communication adaptor comprises:
a memory configured to store, for each of a plurality of the electric devices, the type of running of the electric device;
a specifier configured to specify the type of running associated with the electric device from the memory; and
a running type transmitter configured to transmit the type of running specified by the specifier to the monitoring device, and
the acquirer is configured to acquire the type of running of the electric device from the running type transmitter.

2. The monitoring system according to claim 1, wherein when the first determiner does not receive from the electric device a response to the status acquisition request transmitted by the status acquisition request transmitter, and the type of running acquired by the acquirer indicates that the status of the electric device is not always ON, the first determiner determines that there is a possibility that the status of the electric device is OFF.

3. The monitoring system according to claim 1, wherein when the first determiner does not receive from the electric device a response to the status acquisition request transmitted by the status acquisition request transmitter, and the type of running acquired by the acquirer indicates that the status of the electric device is always ON, the first determiner determines that an abnormality exists in communication between the electric device and the monitoring device.

4. The monitoring system according to claim 1, wherein the acquirer is configured to accept a user input that indicates the type of running of the electric device.

5. The monitoring system according to claim 1, wherein:
the status acquisition request transmitter is configured to transmit the status acquisition request to the electric device periodically; and
when a frequency of a change in presence or absence of a response to the status acquisition request transmitted by the status acquisition request transmitter is less than a threshold, the acquirer acquires the type of running indicating that the status of the electric device is always ON.

6. The monitoring system according to claim 1, further comprising a second communication adaptor configured to communicably connect the electric device with the monitoring device, wherein:
the second communication adaptor comprises:
a detector configured to detect power supplied from the electric device to the second communication adaptor; and
a notifier configured to give, to the monitoring device, a notification of a change in a power supply status of the electric device when presence or absence of the power detected by the detector changes, and
the monitoring device further comprises a second determiner configured to update a flag indicating the power supply status of the electric device based on the notification received from the notifier, and to determine the status of the electric device based on the flag and a response from the electric device to the status acquisition request transmitted by the status acquisition request transmitter.

7. The monitoring system according to claim 1, further comprising a power supply detecting device configured to be communicably connected with the monitoring device, wherein:
the power supply detecting device comprises:
a detector configured to detect electric current supplied to the electric device from a power supply; and
a notifier configured to give, to the monitoring device, a notification of a change in a power supply status of the electric device when a waveform of the electric current detected by the detector matches with a waveform pattern indicating a change in the power supply status of the electric device, and
the monitoring device further comprises a second determiner configured to update a flag indicating the power supply status of the electric device based on the notification received from the notifier, and to determine the status of the electric device based on the flag and a response from the electric device to the status acquisition request transmitted by the status acquisition request transmitter.

* * * * *